UNITED STATES PATENT OFFICE.

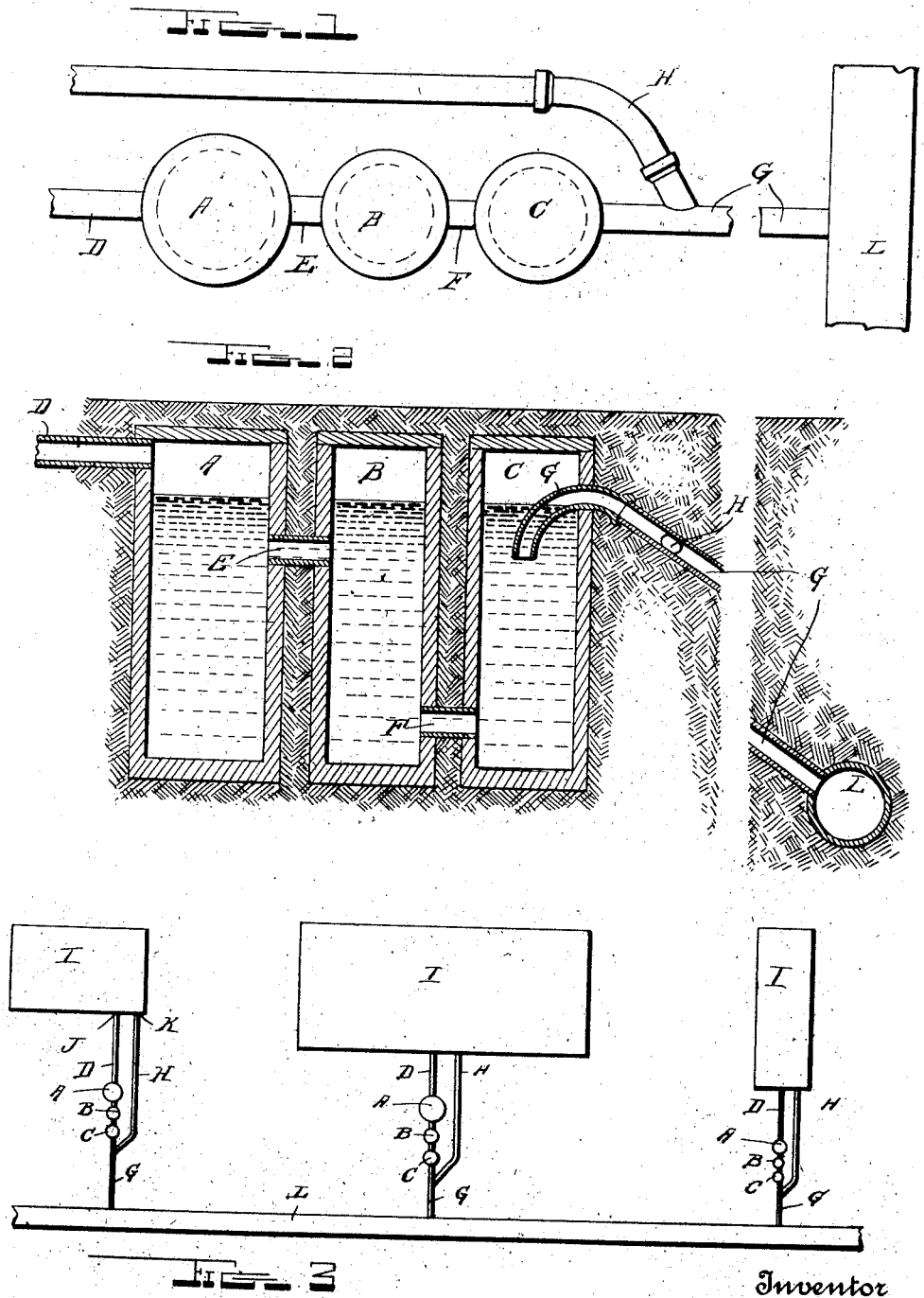

JOHN W. WILSON, OF SAN DIEGO, CALIFORNIA.

PROCESS OF TREATING SEWAGE.

1,331,735.

Specification of Letters Patent.  Patented Feb. 24, 1920.

Application filed December 4, 1916.  Serial No. 134,941.

*To all whom it may concern:*

Be it known that I, JOHN W. WILSON, a citizen of the United States, residing at San Diego, in the county of San Diego and State of California, have invented a new and useful Improvement in Processes of Treating Sewage, of which the following is a specification.

My invention relates to sewage treatment, and may be efficiently carried out by an arrangement of septic tanks and conduits known to the trade as the triplex septic tank unit sewer system.

One object of the invention is to enable the inhabitants of cities, villages and communities to thoroughly purify the sewage and deliver the harmless effluent resulting therefrom at low cost, to the sewer main and thence to the place of final disposal, that is, into irrigation water, streams or other bodies of fresh or salt water or elsewhere.

According to my invention, the septic or putrid and putrefiable sewage is passed from various premises to their each and several septic tanks as shown in the accompanying drawings in which:

Figure 1 is a top plan view of one unit of my improved sewer system;

Fig. 2 is a vertical sectional view of the same; and,

Fig. 3 is a diagrammatic view illustrating a system comprising a plurality of such units in connection with an ordinary sewer main and several premises.

Referring to the drawings in which similar letters refer to similar parts in the several views; each unit, as shown in Fig. 2, comprises a relatively large cylindrical compartment A, relatively small second and third compartments B and C, an inlet pipe D, pipe connections E and F, an outlet pipe or branch G which connects with the sewer main, and a by-pass H which connects to the branch pipe.

In Fig. 3 the letter I represents several houses which may be dwellings, factories, chemical laboratories or other premises or sources of sewage, and each house I may be assumed to comprise a source J of septic or putrefiable sewage and a source K of antiseptic sewage. The letter L designates the sewer main which is common to each house or premises I.

In the first compartment "A" of each septic tank, the incoming sewage is delivered through inlet "D" with a sufficient amount of air to result in an aeration of the sewage contained in this compartment "A," and such aeration produces the best conditions for the breeding of the aerobic microbes which soon become abundant in the compartment A, and this aids in the destruction of the solids in the sewage before it passes to the next compartment "B" through connection "E." Compartment "B" is hermetically sealed aside from its connections E and F, and therefore maintains the proper conditions for the next family of bacteria, known as the anaerobic microbes or liquefying bacteria, under the conditions maintained in this compartment "B," and because of the presence of these anaerobic microbes, further disintegration and liquefaction takes place until the third compartment "C" is reached through connection "F." The conditions of compartment "C" are suitable for the further action of the anerobic bacteria contained therein, and in this compartment the completion of the liquefaction and purification takes place until the effluent is clear and harmless and is discharged through outlet "G." By the locations of the connections "D," "E," "F," and "G," as shown on drawings, and the cylindrical shape of the compartments "A," "B," and "C," it is possible to obtain this result.

The pipe connections D and G are approximately on the same level, and if the connections E and F were also on the same level, solid matter that would float through the connection E would also float through the connections F and G; but the connection E is sufficiently low to obviate the passage therethrough of floating solids, and is sufficiently high above the bottom of the tank to avoid the passage therethrough of any solid that sinks to the bottom. Therefore solid that sinks to the bottom. Therefore nearly all the disintegration takes place in the compartment A, under the influence of the aerobic microbes or bacteria. The disintegrated sewage then passes into the compartments B and C where the anaerobic microbes reduce it to a liquid state.

By my invention I have reversed the methods heretofore in use, that is, instead of turning all sewage and drainage from various premises directly into the sewers and moving the septic sewage, and antiseptic sewage including water being drained from various premises, then running it into a general septic tank or tanks; according to my invention, a septic tank is installed at each of the several premises, and a by-pass connection "H" is provided for each septic tank, for by-passing all drainage of an antiseptic nature directly to the sewer along with the overflow through the connection "G" from the septic tank, as shown on drawing; thereby eliminating the antiseptic elements from the septic tank or tanks, and thus avoiding the consequent harmful effect of imperfect reduction and purification of the sewage and making unnecessary the frequent cleaning out of septic tank or tanks at great trouble and expense.

In connection with my invention it is possible to measure the quantity of sewage to be treated at each house or premises, by water meter or otherwise; whereas, by former methods even though the quantity of sewage could be measured at time of installation of septic tank or tanks, subsequent additions to the city, village or community of new buildings would soon affect the working balance of the septic tank or tanks, and their efficiency would be decreased thereby.

I claim:

The process of segregating and disposing of antiseptic sewage and purifying putrefiable sewage from a source adjacent to that of said antiseptic sewage, consisting in conducting the putrefiable sewage into an influence that effects disintegration of solid material present in the sewage, and retarding the solid material during its disintegration, while allowing it freedom to float or sink; conducting the disintegrated material and liquid material together into an influence that will effect liquefaction of the disintegrated material; conducting the thus liquefied material and the primarily liquid material, together, away from said influences, and then conducting the antiseptic sewage into the presence of the liquefied and primarily liquid effluent at a location out of the presence of the putrefiable sewage.

JOHN W. WILSON.